United States Patent
Kludas (10) Patent No.: US 8,149,388 B2
(45) Date of Patent: Apr. 3, 2012

(54) SURVEYING APPARATUS FOR TRACKING AND SURVEYING AN OBJECT

(75) Inventor: Torsten Kludas, Zottelstädt (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 12/752,817

(22) Filed: Apr. 1, 2010

(65) Prior Publication Data
US 2010/0209090 A1    Aug. 19, 2010

Related U.S. Application Data

(63) Continuation of application No. PCT/EP2007/060769, filed on Oct. 10, 2007.

(51) Int. Cl.
*G01C 3/08* (2006.01)
(52) U.S. Cl. .................. 356/4.01; 356/139.04
(58) Field of Classification Search .......... 356/4.01, 356/5.01, 139.04; 359/399
See application file for complete search history.

(56) References Cited

U.S. PATENT DOCUMENTS

| | | | |
|---|---|---|---|
| 4,386,848 A | 6/1983 | Clendenin et al. | |
| 4,868,591 A * | 9/1989 | Ishiguro | 396/110 |
| 6,487,011 B2 * | 11/2002 | Donath et al. | 359/399 |
| 6,563,574 B2 | 5/2003 | Ohtomo et al. | |
| 6,859,269 B2 | 2/2005 | Ohtomo et al. | |
| 6,957,493 B2 | 10/2005 | Kumagai et al. | |
| 7,055,253 B2 * | 6/2006 | Kaneko | 33/290 |
| 7,564,488 B2 | 7/2009 | Kumagai et al. | |
| 2003/0048355 A1 | 3/2003 | Shimoyama et al. | |
| 2004/0246498 A1 | 12/2004 | Kumagai et al. | |

FOREIGN PATENT DOCUMENTS

| | | |
|---|---|---|
| DE | 103 49 590 A1 | 5/2004 |
| EP | 1 219 925 A2 | 7/2002 |
| EP | 1 347 267 A1 | 9/2003 |
| EP | 1 610 092 A1 | 12/2005 |
| WO | WO 2007/079600 A1 | 7/2007 |
| WO | WO 2007/079601 A1 | 7/2007 |

OTHER PUBLICATIONS

International Search Report and Written Opinion of PCT Application No. PCT/EP2007/060769, mailed Jul. 17, 2008, 11 pages total.

* cited by examiner

*Primary Examiner* — Isam Alsomiri
(74) *Attorney, Agent, or Firm* — Kilpatrick Townsend & Stockton LLP (57) ABSTRACT

A surveying apparatus and method for surveying and tracking a moving object is disclosed to improve the tracking so that a moving object may be tracked reliably and automatically. The surveying apparatus comprises an optical arrangement to sight an object, and a tracking unit to track the sighted object. The tracking unit obtains an object parameter of the object, wherein the object parameter is associated with a movement of the object. Further, the tracking unit issues an instruction to the optical arrangement to change between a close range setting and a long range setting according to the obtained object parameter, the close range setting corresponding to a wide field of view and the long range setting to a narrow field of view.

22 Claims, 10 Drawing Sheets

SURVEYING APPARATUS FOR TRACKING AND SURVEYING AN OBJECT

CROSS-REFERENCES TO RELATED APPLICATIONS

This application claims priority to and is a continuation of International Patent Application No. PCT/EP2007/060769, filed on Oct. 10, 2007, the disclosure of which is hereby incorporated by reference in its entirety for all purposes.

BACKGROUND OF THE INVENTION

The present invention relates to a surveying apparatus and method for surveying an object, and in particular, to a surveying apparatus and method for surveying and tracking a moving object.

Optical instruments, such as surveying instruments are commonly used for measuring a position of an object to obtain information, such as horizontal and vertical angles and distance.

A conventional surveying instrument comprises a telescope system for sighting an object which can then be imaged on a camera behind the telescope system. Further, such an instrument may comprise a distance measurement unit to measure a distance to the object sighted by the telescope system. The viewing angle of the telescope system is generally very small, e.g. 1 to 2 degrees, thus also the field of view of the telescope is small and a user has to position the surveying instrument and adjust the optics of the telescope system so that the object to be sighted and to be measured is exactly in the small field of view of the telescope system and optimally on the optical axis of the telescope system, ultimately e.g. to measure a distance to the object.

However, in certain cases the object may move so that the user has to readjust the instrument each time anew before measuring the distance to the object.

Recently, surveying instruments with tracking systems have been proposed to follow the position of a moving object. For example, a laser tracker comprising a laser beam may be used to track an object. Thereby, a pivotable mirror may be used to deflect the focused laser beam in the direction of the object and the direction may then be recorded using the angles of the mirror position, for example for changing the optical axis of the apparatus for distance measurement.

However, tracking an object with the above described instrument is only possible as long the focused laser beam is reflected from a reflector at the object back to the laser tracker. It can be hard to meet this condition, especially when the object is moving quickly.

Therefore, in both of the above described instruments, it is difficult to sight and measure a distance to an object, in particular to an object which is not static with respect to the surveying instrument.

In the first example of the surveying instrument, the user has to adjust the telescope system for each movement of the object, which is time consuming and difficult, especially if the object is not in the small field of view.

In the second example of the surveying instrument, since the tracking is dependent on the laser light hitting a reflector and on the reflected light being received again by the laser tracker, the angles of the laser tracker and of the reflector are crucial.

In addition to the above-mentioned problems, it is also possible that the part of the object carrying the reflector is occluded by an obstacle. This would also render tracking impossible, even so other parts of the object may still be visible.

SUMMARY OF THE INVENTION

Therefore, there is a need for a surveying apparatus and method for surveying and tracking a moving object reliably.

According to an embodiment, a surveying apparatus for surveying an object comprises an optical arrangement to sight an object; a tracking unit to track the sighted object; wherein the tracking unit is adapted to obtain an object parameter of the object, and wherein the object parameter is associated with a movement of the object; and the tracking unit is further adapted to issue an instruction to the optical arrangement to change between a close range setting and a long range setting according to the obtained object parameter, the close range setting corresponding to a wide field of view and the long range setting to a narrow field of view. Accordingly, the movement of an object may even then be tracked automatically and reliably, when the object is moving fast and close to the surveying apparatus, since the moving object may be tracked with an optical arrangement changing from a narrow field of view to a wide field of view.

According to an advantageous example, the tracking unit is adapted to track the object to maintain the object on the optical axis of said optical arrangement. Accordingly, the exact position of the object in terms of horizontal and vertical angles may continuously be monitored, since the optical arrangement is continuously repositioned corresponding to the movement of the object so that the optical axis of the optical arrangement is pointing on the object. Furthermore, by maintaining the object on the optical axis of the optical arrangement, also a reliable distance measurement may be performed at any time to obtain the distance to the object.

According to another advantageous example, the tracking unit is adapted to track the object to maintain the object in the field of view of said optical arrangement. Accordingly, even in a case, in which it is difficult to maintain the object on the optical axis, the object may at least be maintained in the field of view so that the object is not lost out of sight.

According to another advantageous example, the tracking unit is adapted to determine whether the object is in the narrow field of view and, if the object is not in the narrow field of view, to instruct the optical arrangement to change from a long range setting to a close range setting. Accordingly, the object may be detected without changing the position of the optical arrangement by increasing its field of view.

According to another advantageous example, the tracking unit is adapted to instruct the optical arrangement to change from a close range setting to a long range setting before performing a position measurement of the object. Accordingly, a position measurement of the object may be performed with high accuracy.

According to another advantageous example, the tracking unit is adapted to compare the obtained object parameter with a threshold value and the optical arrangement is instructed to change the field of view based on the comparison. Accordingly, the field of view may be adjusted automatically according to the object parameter so that the object may be tracked reliably by the surveying apparatus.

According to another advantageous example, the optical arrangement comprises a first and a second optical unit, and the first optical unit is adapted for wide field viewing and the second optical unit is adapted for narrow field viewing. Accordingly, the same optical arrangement may be used for objects at different positions and with different velocities so that only one imaging device to acquire the image of the sighted object can be used in conjunction with the optical arrangement.

According to another advantageous example, the optical arrangement comprises a zoom lens adjustable to perform wide field viewing and narrow field viewing. Accordingly, a small and compact optical arrangement may be provided for sighting an object at different positions and with different velocities.

According to another advantageous example, the object parameter is proportional to at least one of the distance to the object, the angular velocity necessary to track the object, the size of the object in relation to the field of view, and the intensity of an EDM-signal from the object. Accordingly, the optical arrangement may be changed reliably based on the object parameter, since the object parameter describes the movement of the object in radial direction and/or in horizontal direction.

According to another advantageous example, the object parameter is dependent on whether the object is in the field of view or not. Accordingly, the optical arrangement may be set to a wide field of view, if the object is not in the field of view and may be set to a narrow field of view if the object is in the field of view so that a reliable distance and direction measurement may be performed.

According to another advantageous example, the surveying apparatus further comprises at least one of an imaging device for acquiring an image of at least part of the object; a distance measurement unit for measuring a distance to the object along an optical axis; a positioning unit for adjusting the optical axis of the optical arrangement relative to at least one reference axis, and a control unit for controlling the components of the surveying apparatus for surveying. Accordingly, the optical axis of the optical arrangement may be adjusted to the position of the moving object, the image of the sighted object may be acquired and the distance to the object may be measured.

According to another embodiment, a surveying method for surveying comprises sighting an object with an optical arrangement; tracking the sighted object; obtaining an object parameter of the object, wherein the object parameter is associated with a movement of the object; and changing, by using the optical arrangement, between a close range setting and a long range setting according to the obtained object parameter, wherein the close range setting corresponds to a wide field of view and the long range setting to a narrow field of view. Accordingly, the object may reliably and automatically be tracked and sighted, even if the object is moving with a high velocity, since the optical arrangement may be adjusted to change from narrow field of view to wide field of view.

According to another embodiment, a program may be provided including instructions adapted to cause data processing means to carry out the method with the above features.

According to another embodiment, a computer readable medium may be provided, in which a program is embodied, where the program is to make a computer execute the method with the above features.

According to another embodiment, a computer program product may be provided, comprising the computer readable medium.

Further advantageous features of the invention are disclosed in the claims.

DETAILED DESCRIPTION OF THE INVENTION

Preferred embodiments of the invention are described with reference to the Figures. It is noted that the following description contains examples only and should not be construed as limiting the invention.

Embodiments of the invention generally relate to surveying and automatically tracking an object by using an optical arrangement, in which the field of view may be adjusted according to an object parameter so that the field of view of the optical arrangement may be adjusted to the movement of the object and thus the object is maintained in the field of view.

Briefly said, in one embodiment the optical arrangement sights the object, which is tracked by a tracking unit. The tracking unit obtains an object parameter related to the movement of the object, which is then used to determine the field of view of the optical arrangement to maintain the object in the field of view. Finally, as long as the approximate position of the object is known, namely as long as the object is in the field of view, the optical axis of the optical arrangement may be adjusted to point to the object to allow measurement of the distance to the object.

Figure 1:
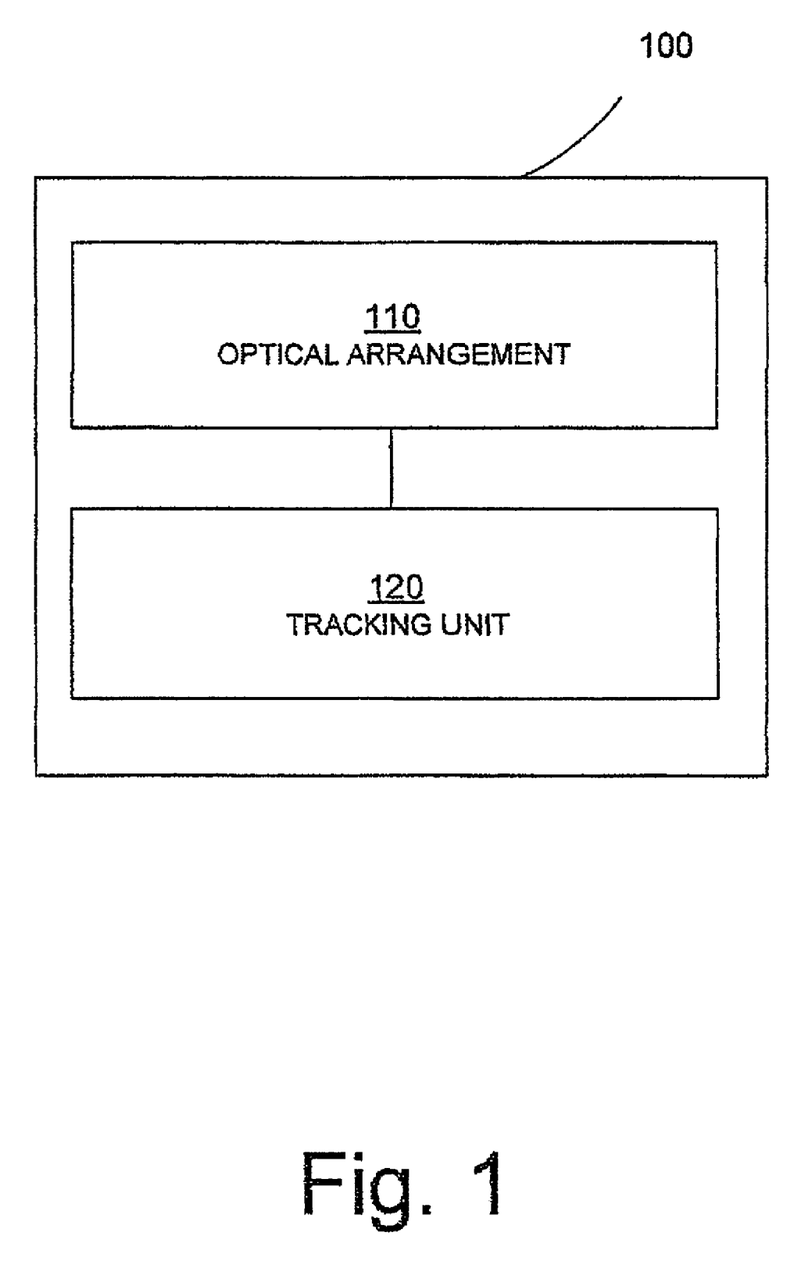
FIG. 1 illustrates elements of a surveying apparatus according to an embodiment of the invention.

FIG. 1 illustrates elements of a surveying apparatus 100 according to an embodiment of the invention, comprising an optical arrangement 110 and a tracking unit 120.

These elements may constitute individual elements being connected with each other as shown in FIG. 1, or may be integrated in one unit. The elements or the integrated unit may be realized by a hardware arrangement, such as hard-wired circuits or ASICs (application specific integrated circuits) or software or any suitable combination of the above and the appropriate optics required for the optical arrangement 110. The functions performed by the optical arrangement 110 and the tracking unit 120 will be described in detail below.

The tracking unit 120 is adapted to obtain an object parameter of the object, which is associated with a movement of the object and may further be adapted to issue an instruction to the optical arrangement 110 to change between a close range setting and a long range setting according to the obtained object parameter, wherein the close range setting corresponds to a wide field of view and the long range setting to a narrow field of view.

The optical arrangement 110 is provided to sight the object. The optical arrangement 110 may comprise optical lenses to focus on the object. In particular, the lenses of the optical arrangement are arranged so that a narrow field of view and a wide field of view can be provided. A more detailed description of suitable lens arrangements will be described further below with respect to FIGS. 7 and 8.

In detail, when the optical arrangement 110 sights an object, the tracking unit 120 tracks the sighted object and obtains one or more object parameters of the object, such as the distance to the object, an angular velocity necessary to track the object, the size of the object in relation to the field of view, or the intensity of a received EDM-Signal, i.e. the back-reflected signal of an electro-optical distance measurement unit. Subsequently, the tracking unit 120 evaluates the obtained object parameter and may issue an instruction to the optical arrangement 110 to change from a close range setting to a long range setting or vice versa, based on the obtained object parameter.

Figure 2A:
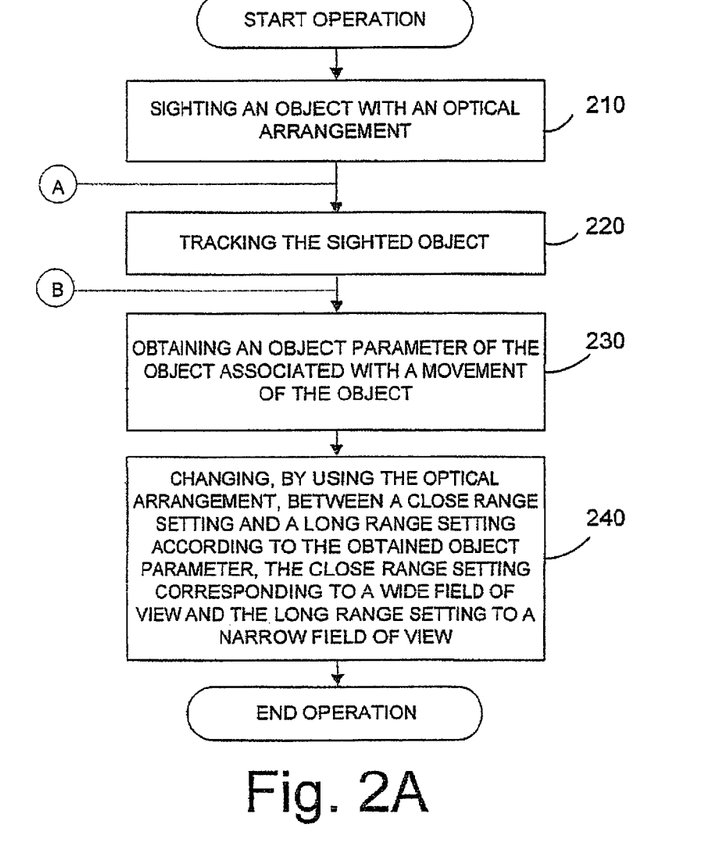
FIG. 2A illustrates operations of a method for surveying and tracking an object according to an embodiment of the invention.

In the following, operations of a surveying apparatus will be described with respect to FIG. 2A. FIG. 2A illustrates a flow diagram of operations of a method for surveying and tracking an object, such as during operation of the surveying apparatus shown in FIG. 1.

The surveying apparatus 100 may be integrated in or constituted by a video surveying instrument, such as a video theodolite or a video tacheometer, also know as a tachymeter or total station or any other kind of optical instrument used for surveying, and in particular for tracking an object and determining a position of an object.

In a first operation 210, an object is sighted with an optical arrangement 110, e.g. a suitable lens arrangement to be described further below. Sighting the object with the optical arrangement 110 preferably includes adjusting the optical axis of the optical arrangement 110 relative to at least one reference axis of the surveying apparatus 100 so that the optical axis of the optical arrangement points in the direction of the object. In other words, where appropriate, the actual viewing direction preferably defined by the optical axis of the optical arrangement 110 is aligned with the object.

Adjusting the optical axis of the optical arrangement may be performed in several different ways and has been described in detail in the prior art, e.g. by a mirror following the object or by moving part of the surveying apparatus 100 itself, at least the optical arrangement, in the direction of the object, which will be described in more detail below.

In a subsequent operation 220, the sighted object is tracked. Tracking of an object may also be performed in several different ways, one of which has been described above with respect to the prior art, and a different example may include an imaging device, on which the object to be tracked is imaged. By subsequently using image processing on the acquired image, the image of the object on the imaging device may be followed, until it reaches the edge of the imaging array of the imaging device. An example of an imaging device will also be described below.

In an operation 230, after sighting and tracking the object according to operations 210 and 220, an object parameter of the object being associated with the movement of the object is obtained.

Figure 2B:
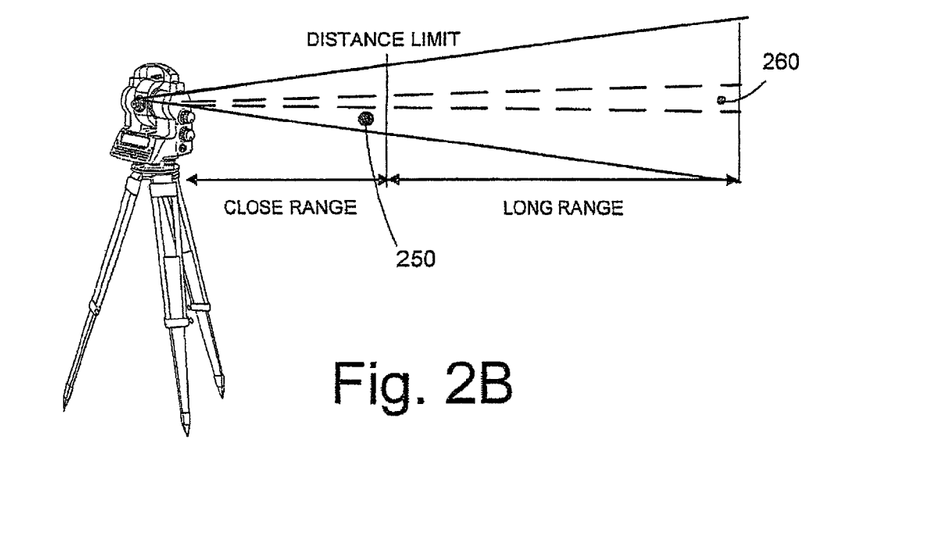
FIG. 2B illustrates an optical instrument incorporating the surveying apparatus and depicts an example of determining the object parameter.

As described above, there are several object parameters which may describe the movement of an object: and may be obtained in different ways. For example, as shown in FIG. 2B, an object 250, 260 may be positioned at different distances, close to the surveying instrument (object 250) or far away from it (object 260), wherein the distance may be measured in a first approximation by sighting or focusing on the object and more accurately by performing a distance measurement with an EDM, for example. This object parameter, namely the distance to the object in this case, may then be supplied to the tracking unit 120.

In an operation 240, the optical arrangement 110 is used to change between a close range setting and a long range setting according to the obtained object parameter, wherein the close range setting corresponds to a wide field of view and the long range setting to a narrow field of view.

For example, as shown in FIG. 2B, the object parameter may be the distance to the object, and it may be necessary to change to an optical arrangement 110 with a wide field of view to view the object 250, if the object is in the close range, since an optical arrangement 110 with a narrow field of view would not detect the object 250 in the close range.

However, for an object 260 in the long range, a long range setting of the optical arrangement having a narrow field of view may be preferable, since then the focusing and sighting of the object and consequently a distance measurement may be obtained with more accuracy. In the example shown in FIG. 2B, a distance limit is shown, which may be compared to the object parameter, e.g. the measured distance, to decide whether an object is in the close range or long range.

Therefore, the object may be tracked reliably independent of its movement. In detail, even when an object, for example moving with high angular velocity around the surveying apparatus and the angular velocity being faster than a tracking sensor or a positioning unit of the surveying apparatus, it is still possible to track the object by increasing the field of view in which the object travels so that the object is present for a longer time in the field of view and the requirements on the angular velocity of the tracking unit or positioning unit are relaxed.

In other words, the larger the object appears in the field of view, the quicker it may move out of the field of view so that, when using an optical arrangement with a wide field of view, objects may move quite quickly and may still be tracked.

Furthermore, a larger part of the movement path of the object is obtained with an optical arrangement with a wide field of view so that a good prediction of the movement direction may be obtained, which can then be used to find the position of the object, once it is lost, due to an occlusion or high velocity. Another advantage of the wide field of view is that multiple objects may be tracked in parallel with a wide field of view.

In more detail, the tracking unit 120 may be adapted to follow a path of the object acquired by an imaging device, even if the object is suddenly occluded, i.e. the object disappears from an imaging array of the imagining device although the edge of the imaging array has not been reached. This may be realized by extrapolating the path on the imaging array and predict the movement of the object. Once it is predicted that the object moves over the edges of the imaging array, the optical axis of the optical arrangement 110 may be readjusted, for example by a positioning unit, as described with respect to FIG. 7.

Here, an object may be any type of object, e.g. a reflective or non-reflective object. Preferably, a reflector prism or mirror is used that may be mounted on a vehicle or may be carried by a person. For example, at a construction site a reflector may be mounted on a bulldozer so that the movement can be tracked. However, since the surveying apparatus is also able to track non-reflective objects, it may also be possible to sight and track a distinct part of a construction site vehicle, e.g. a corner of the driving cab of the vehicle. To enable this kind of tracking, a special shape to be tracked may be predefined.

In the following, a further embodiment will be described with respect to FIG. 3, particularly illustrating different kinds of tracking the object. Thus, FIG. 3 may be considered as an alternative or more detailed description to operation 220.

In an operation 320, following operation 210 of FIG. 2A, it is determined whether tracking the sighted object on the optical axis of the optical arrangement is possible. For example, the movement of the object may be such that maintaining the object on the optical axis of the optical arrangement 110 is not possible, owing to the speed limitations of the moving positioning parts in a surveying apparatus.

If tracking of the sighted object on the optical axis is possible, for example the movement of the object is such that it can be easily tracked by the surveying apparatus 100, the procedure proceeds to operation 322.

As described above, when using an optical arrangement 110 with a wide field of view, it is easier to track the object, since the object stays in the wide field of view longer than in a narrow field of view so that the object is not lost and tracking or repositioning the surveying apparatus 100 may be performed.

On the other hand, when tracking by maintaining the object on the optical axis is possible, either with a close range setting or a long range setting, the surveying apparatus is readily set up to take measurements of the distance to the object.

However, if tracking the sighted object on the optical axis is not possible, the object is tracked by maintaining it in the field of view of the optical arrangement 110 in operation 324.

Figure 3:
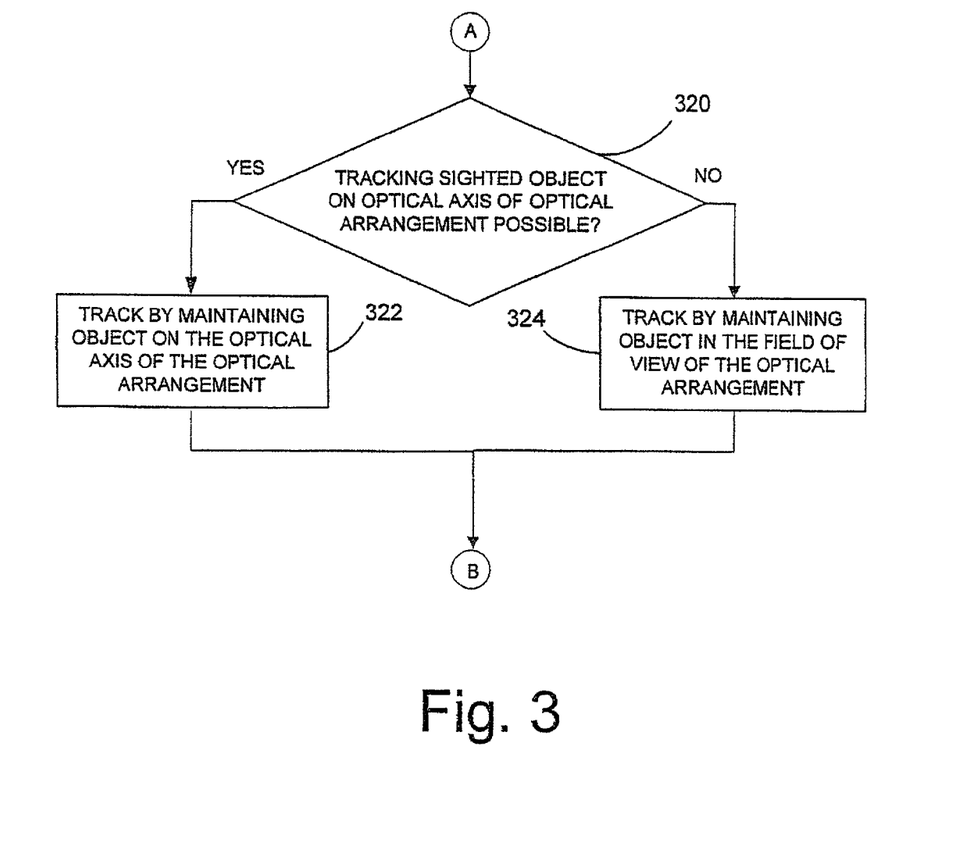
FIG. 3 illustrates operations of a method for surveying and tracking a moving object according to an embodiment of the invention, particularly illustrating different tracking modes.

Further, which is not shown in FIG. 3, in a subsequent operation to operation 324, the surveying apparatus 100 may determine whether tracking is performed in the narrow field of view or the wide field of view, and if necessary, might switch to the wide field of view so that the risk of losing the object is reduced. Still further, the determination in operation 320 may be repeated at any time, since the movement of the object may change with time, and thus it may be possible to track the object on the optical axis of the optical arrangement at a later stage.

Finally, the operation 230 discussed above follows, in which the object parameter is obtained. In this method described in FIG. 3, which is a modification of FIG. 2A, operations 210, 230 and 240 are the same as previously discussed with respect to FIG. 2A and thus will not be explained in further detail to avoid unnecessary repetition.

Figure 4:
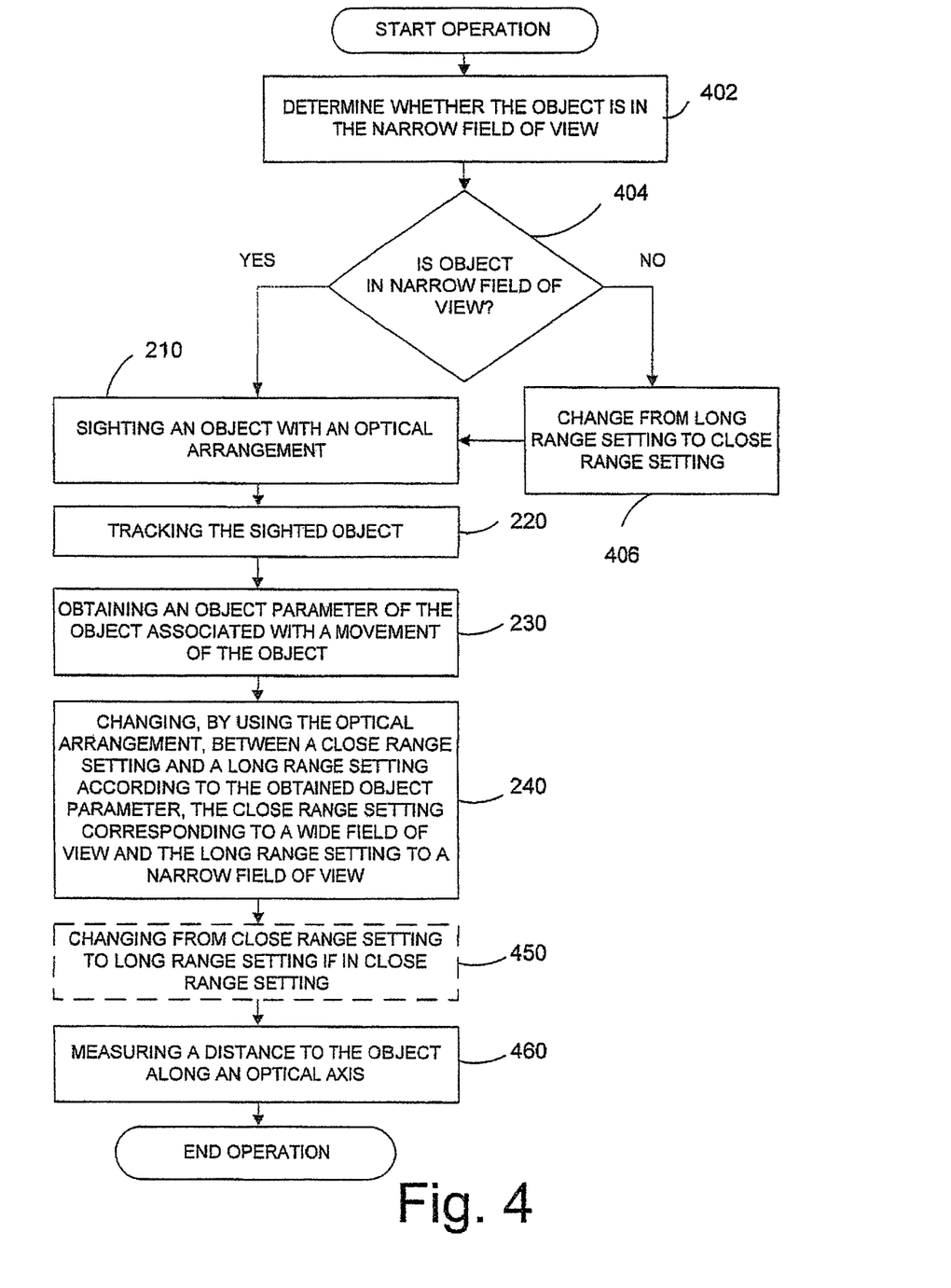
FIG. 4 illustrates operations of a method for surveying and tracking an object according to an embodiment of the invention, particularly illustrating a start procedure and an end procedure.

In the following, a further embodiment will be described with regard to FIG. 4, particularly illustrating a preferable start procedure preceding the method of FIG. 2A and a preferable end procedure following the method described with respect to FIG. 2A. In the method of FIG. 4, the operations 210 to 240 are the same as previously discussed with respect to FIG. 2, and thus will not be explained in detail to avoid unnecessary repetition.

At the beginning of the procedure, it is determined in operation 402, whether the object is in the narrow field of view. For example, the simplest case for such a determination is that a user looks through an ocular of the optical arrangement and determines whether he sees the object or not.

In a more sophisticated example, which will also be discussed below, an imaging device is used to image the field of view provided by the optical arrangement, and subsequently an image processing algorithm is used on the image of the field of view to determine the presence of an object.

If the object, in operation 404, is not in a narrow field of view, the procedure proceeds to operation 406, in which the optical arrangement is changed from a long range setting to a close range setting.

In operation 406, it is assumed that at least with the close range setting the object is in the wide field of view so that the following operation would be operation 210. However, which is not shown in FIG. 4, it may be possible that the object is also not in the wide field of view, and thus might not be detected by the surveying apparatus. In this case, the optical axis of the optical arrangement has to be readjusted to another position and the procedure should start again with operation 402.

If it is determined in operation 404 that the object is in the narrow field of view, the procedure proceeds to operation 210, in which the object is sighted with the optical arrangement, as described above. The following operations 210 to 240 are the same as described with respect to FIG. 2A, and it is referred to the description of FIG. 2A for a detailed explanation.

In operation 450, if the optical arrangement 110 is in the close range setting, the optical arrangement preferably changes from the close range setting to the long range setting so that sighting a particular position of the object to be measured can be performed more accurately.

Finally, in operation 460, the distance to the object is measured along an optical axis, which is preferably the optical axis of the optical arrangement. However, in practice the distance is measured preferably by an EDM and the optical axis of the optical arrangement 110 and the measurement axis of the EDM, or another distance measurement unit, usually do not overlap but may be parallel to each other, which will be described later with respect to FIG. 7.

It should be noted that operation 450, namely instructing the optical arrangement to change from a close range setting to a long range setting before performing a position measurement of the object, is optional, indicated by the dashed line, since a distance measurement may also be taken, when the optical arrangement is in the close range setting. However, as described above, better results may be achieved when the optical arrangement is in the long range setting.

Further, the operations 402 to 406 may also be performed instead of operation 240, m case an object parameter cannot be obtained in operation 230. In this case, the object parameter may be considered an object parameter dependent on whether the object is in the field of view or not.

In other words, if the object is not in the field of view, the optical arrangement 110 should change from a long range setting to a close range setting and if the object is in the field of view, it should be possible to obtain the object parameter.

In the following, a further embodiment will be described with respect to FIG. 5, particularly illustrating operations with respect to changing the range setting and correspondingly the field of view of the optical arrangement.

In operation 210, the object is sighted with the optical arrangement, as described previously. Preferably, the previously described operations 402 to 406 may be performed, preceding the operation 210.

In operation 220, the sighted object is tracked, as described above, wherein the tracking may be performed as described with respect to FIG. 3.

In operation 230, the object parameter associated with the movement of the object is obtained. The different object parameters and the way how they are obtained will be described in detail with respect to FIGS. 6 and 7 in the following. Here in FIG. 5, the general procedure of changing between a close range setting and a long range setting according to the obtained object, namely the previously described operation 240, will be described in more detail.

Figure 5:
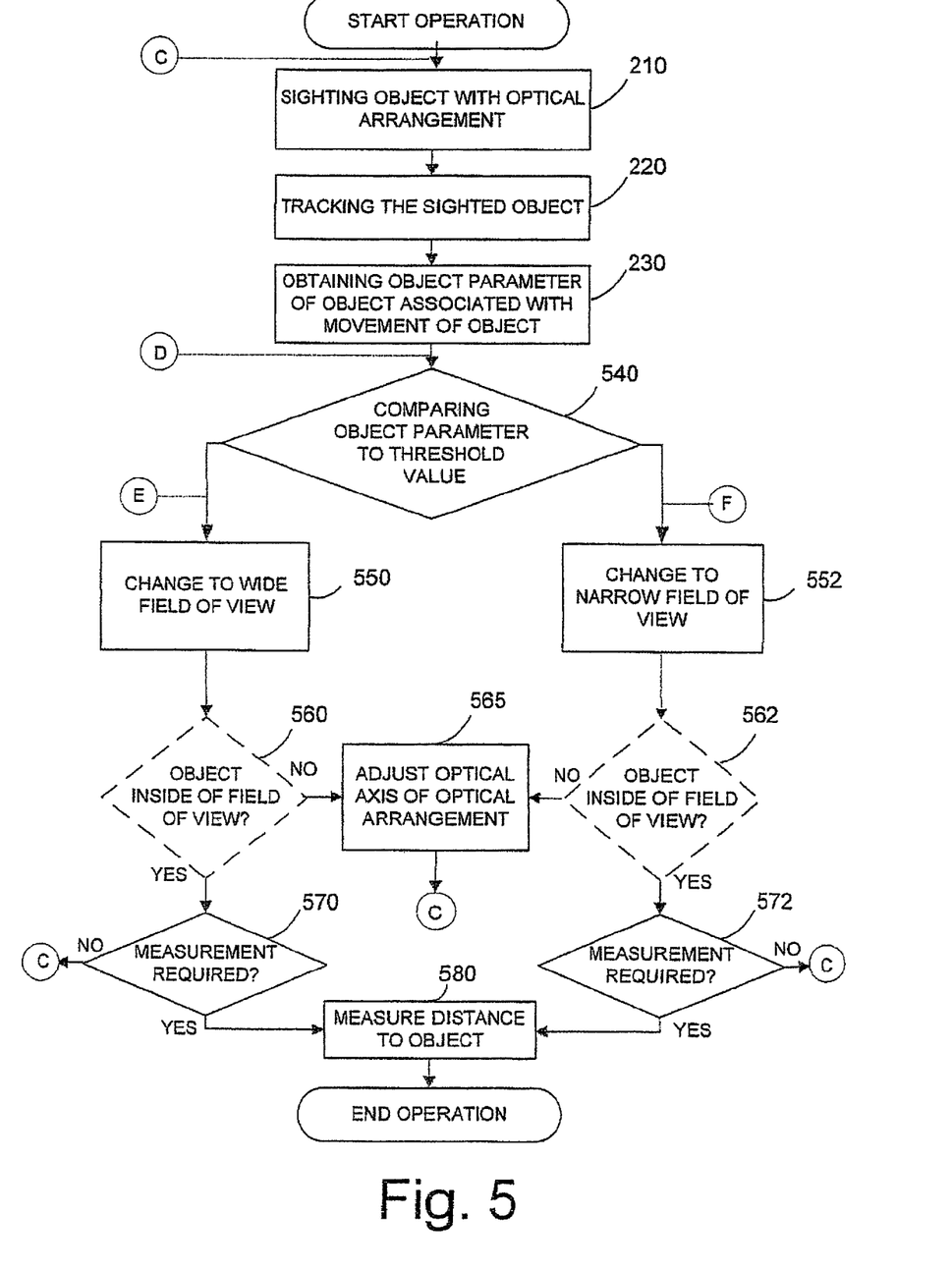
FIG. 5 illustrates operations of a method for surveying and tracking of an object according to an embodiment of the invention, particularly illustrating operations with respect to changing the field of view of the optical arrangement.

In operation 540 of FIG. 5, the obtained object parameter is compared to a threshold value. For example, as previously described in FIG. 2B, the distance to an object constituting an object parameter is compared to a distance limit previously stored as a threshold value. If the distance to the object exceeds the distance limit, the setting of the optical arrangement 110 is changed to a long range setting, namely a narrow field of view, as shown by operation 552 in FIG. 5.

If the distance to the object is below the distance limit constituting the threshold value, the procedure proceeds to operation 550, in which the setting of the optical arrangement 110 is changed to a close range setting, namely to a wide field of view.

After the optical arrangement has been changed according to the object parameter in operation 550 or 552, it is preferable to verify whether the object is actually still inside the field of view, which is shown by operation 560 and 562, respectively.

If the object is not in the field of view, the procedure proceeds to operation 565, in which the optical axis of the optical arrangement 110 is adjusted, i.e. the optical arrangement is repositioned with its optical axis pointing to another position in space and the above described operations are repeated.

If the object is still inside the field of view in the determination in operations 560 or 562, it is determined in operations 570 and 572, respectively, whether a distance measurement is required. In case no distance measurement is required, the operation flow returns to the start of the procedure in FIG. 5 and the above described operations are repeated, namely the object is continuously tracked and at least one of the described object parameters is derived.

If it is determined in operation 570 or 572 that the measurement of the distance to the object should be performed, the procedure proceeds to operation 580, where a measurement of the distance to the object is taken by a distance measurement unit which will be described in detail below.

As described above, it may be preferable to take a distance measurement, while the optical arrangement is in a long range setting, namely a narrow field of view, and the object is on the optical axis of the optical arrangement so that reliable and highly accurate measurements are obtained.

Next, operations 230 and 540 of FIG. 5 will be described in more detail by giving examples of object parameters and examples of how object parameters may be obtained. For illustrative purposes, this will be explained with respect to the FIGS. 6A to 6E and FIG. 7.

Figure 6A:
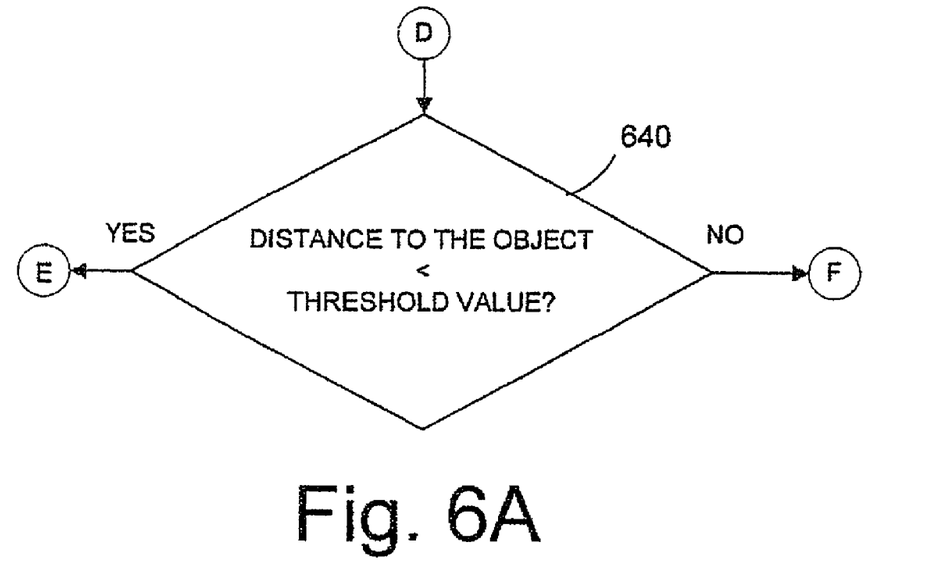
FIGS. 6A-6E illustrate operations of methods for surveying and tracking an object, describing in detail the comparison operation of FIG. 5.

FIGS. 6A to GE illustrate operations of methods for surveying and tracking an object, describing in detail the comparison operation described in FIG. 5.

In FIG. 6A1 the previously discussed example relating to FIG. 2B is shown. Here, in operation 640, a distance to the object is compared to a threshold value. In this case, the threshold value could be a distance limit as described with respect to FIG. 2B.

In detail, an object parameter, here the distance to the object, is obtained in operation 230 preceding the operation 640, and in operation 640, the distance to the object is compared to the distance limit. It should be noted that, as described in FIG. 5, tracking the object and comparing its object parameter describing the movement of the object, may be performed continuously in a loop, since the object usually moves differently with time.

Figure 6B:
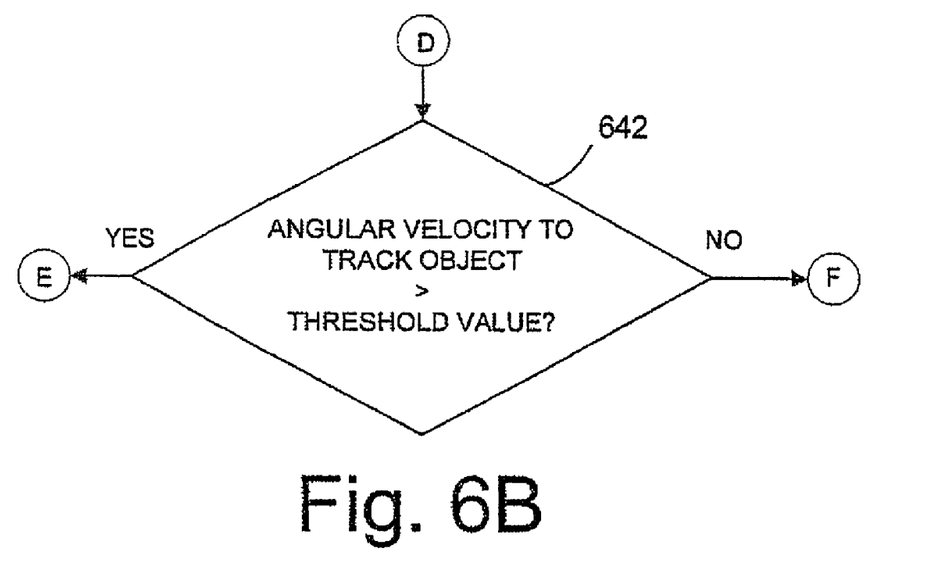

In FIG. 6B1 a similar operation to operation 640 is described. In this operation 642, the angular velocity necessary to track the object is compared to a threshold value. This is the angular velocity or rotational speed of a positioning unit of a surveying apparatus that is required to reposition or readjust the optical axis of the optical arrangement 110 to follow a moving object and to maintain the moving object in the field of view of the optical arrangement 110.

The field of view may be recorded by an imaging device for detecting the movement of the object, namely a position change of the image of the object on an imaging array of the imaging device. Thereby, the imaging device and positioning unit may constitute a part of the tracking unit or may be independent elements as described in FIG. 7.

Similar to FIG. 5 and FIG. 6A, if the angular velocity necessary to track the object is higher than the threshold value, i.e. the object moves quite quickly in a direction perpendicular to the optical axis of the optical arrangement 110, it is preferable to change to the wide field of view so that the object is not lost while being tracked. Otherwise, if the angular velocity necessary to track the object is smaller than the threshold value, the object may also be tracked with the optical arrangement having a narrow field of view.

Figure 6C:
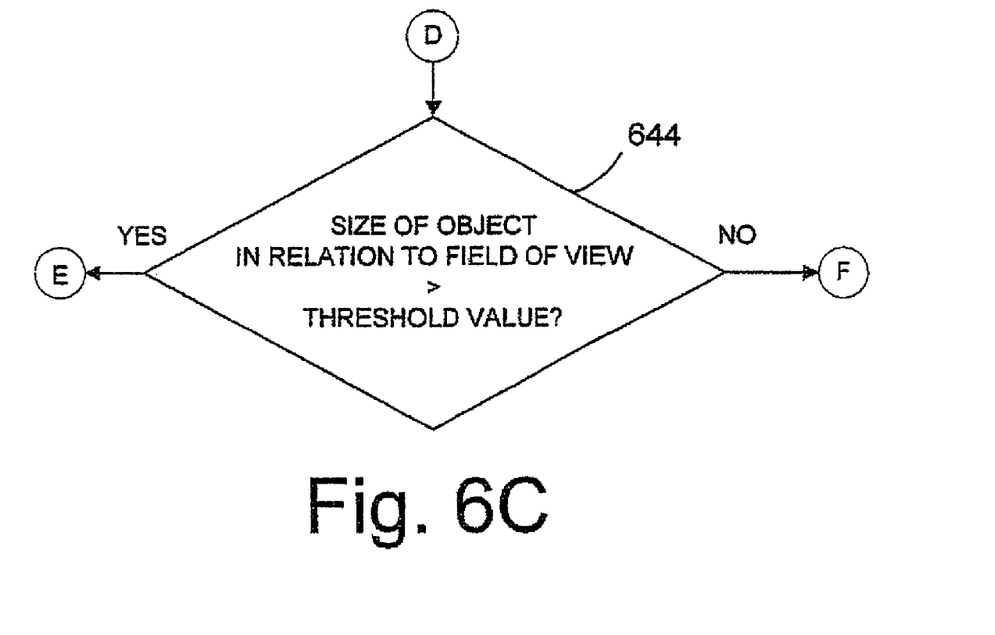

In FIG. 6C, the size of the object, or to be more precise, the size of the image of the object, in relation to the field of view, is compared to a threshold value in operation 644. Here, the threshold value relates to a specific object size in relation to the size of the field of view. If the size of the image of the object in relation to the field of view is large, this may be an indication that the object is close to the surveying apparatus and thus the object may easily be lost, since even small movements may result in the object getting out of the field of view.

Therefore, to maintain the object in the field of view, changing to a wide field of view is advantageous.

The object size and structure is more constant over the range with a wide field of view that helps to detect and track any object, such as also natural objects or patterns, and not only reflectors as state of the art tracking systems do. Further, the tracking accuracy is also more constant over the range.

Furthermore, if the object at close range is not so large, the area of interest is smaller so that an imaging device with a smaller imaging array may be selected to track the object increasing the frame rate and tracking speed.

Figure 6D:
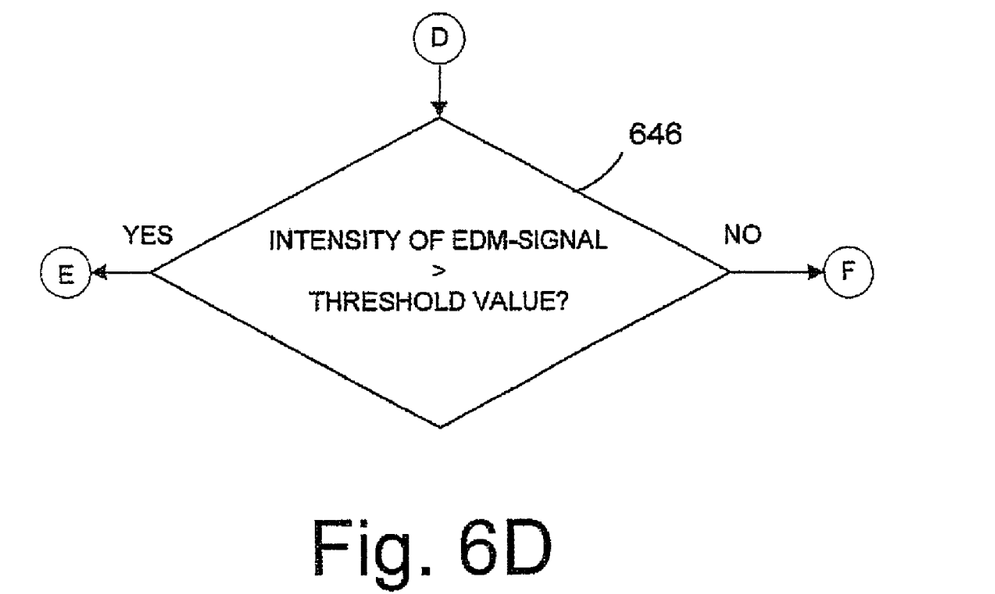

In FIG. 6D, another object parameter is explained, namely the intensity of the EDM-signal. The intensity of the EDM-signal in operation 646 may be described as the intensity of the back-reflected light from an object that has been emitted by a distance measurement unit for measuring the distance to the object.

Conventionally collimated light is sent out in a radial direction from a surveying apparatus to perform a distance measurement by using a pulse method or phase method as known from the prior art. However, in certain cases, it may not be possible to measure the distance to the object with the distance measurement unit, because of the fast movement of the object in radial direction that may not allow an exact distance measurement by using the pulse method or phase method.

However, even if an exact measurement of the distance cannot be achieved due to the lack of pulse or phase correlations, the intensity itself reflected back by the object may already be used as a measure of the distance, namely if the received back-reflected intensity is high, the object may be close to the surveying apparatus and if the intensity is low, the object may be far away from the surveying apparatus.

It should be appreciated that the invention is not limited to the above described four object parameters and other criteria may also be used to determine whether to change the optical arrangement. For example, another object parameter may be the intensity of a back reflected signal from a tracking unit, in particular, from a tracking unit using a laser tracker, such as the one described above.

In FIGS. 6A to 6D, the comparison operation 540 of FIG. 5 has specifically been explained with individual object parameters. However, as will be discussed with respect to FIG. 6E, also a combination of the parameters may be used, which may give more accurate results when trying to assess the movement of an object.

In the example shown in FIG. 6B, all four previously described object parameters are used in series to determine whether to change the field of view of the optical arrangement 110.

Figure 6E:
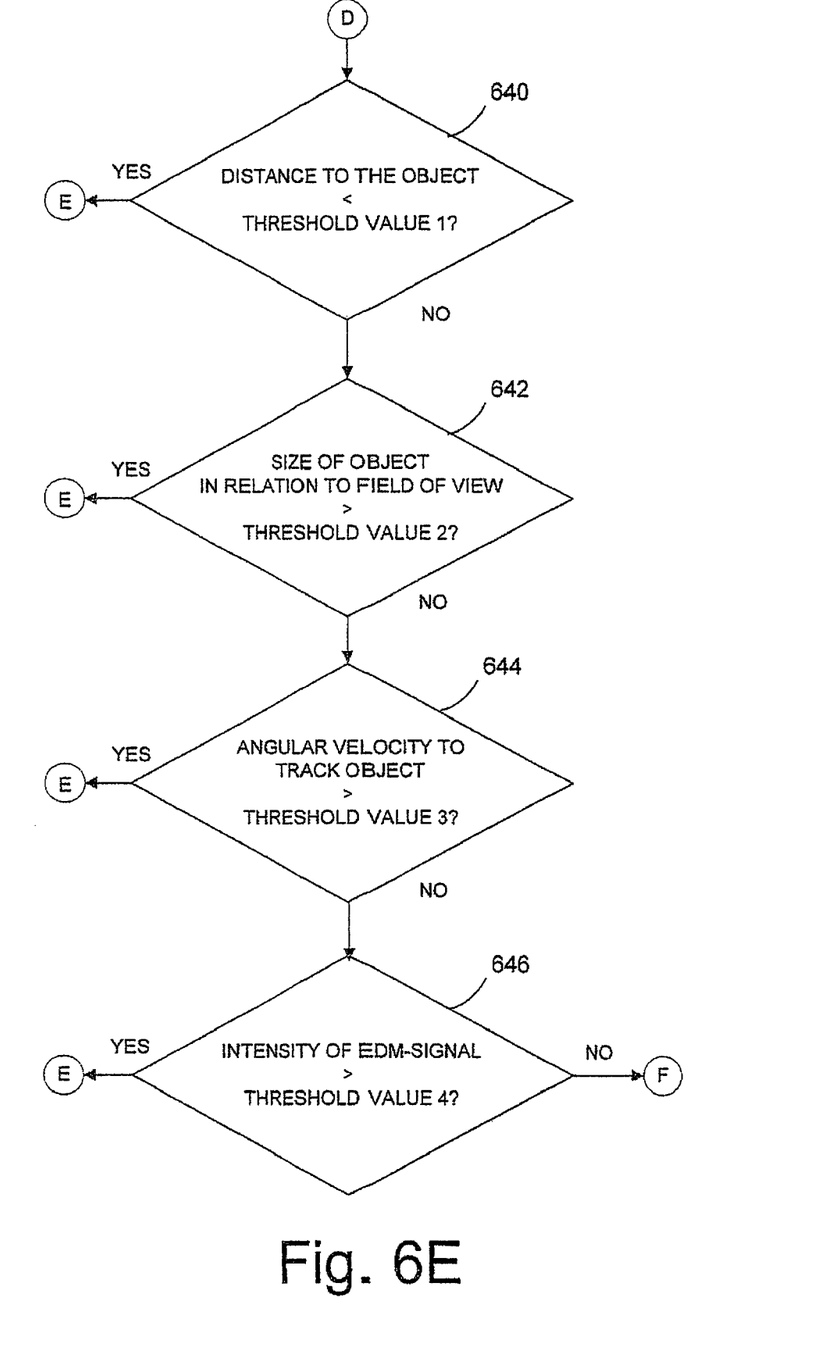

It should be understood, that any other combination of the four object parameters or also only a combination of two or three object parameters may also be suitable for the comparison. For example, operation 646 may be followed by operations 644 and 642 or operation 640 may be followed by operations 644 and 646.

Such combinations are advantageous, since some parameters are more sensitive to the movement in radial direction away or to the surveying apparatus and other parameters are more sensitive to movement in a plane perpendicular to the radial direction.

Figure 7:
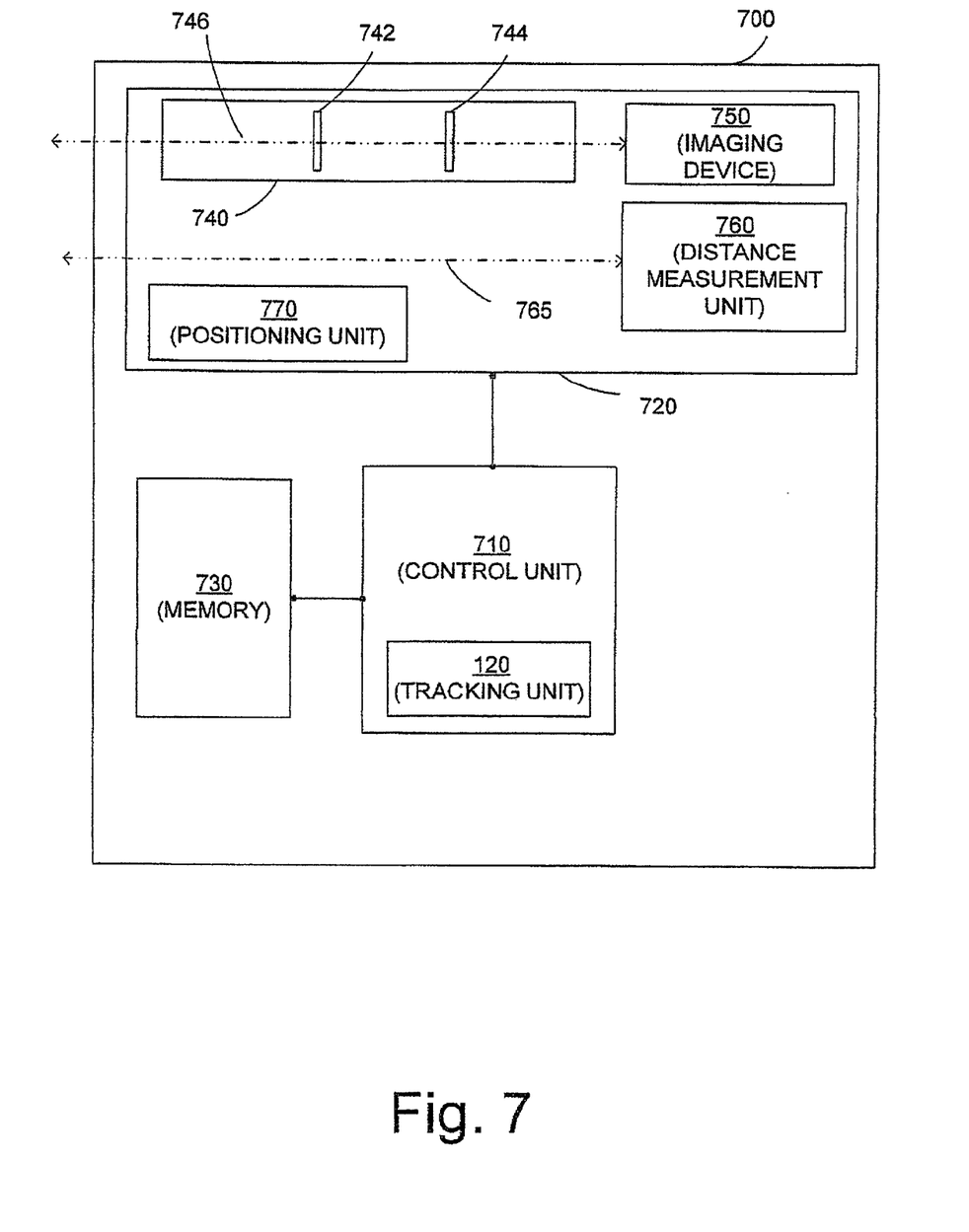
FIG. 7 illustrates elements of a surveying apparatus according to another embodiment of the invention.

FIG. 7 illustrates elements of a surveying apparatus according to another embodiment of the invention. This surveying apparatus 700 may be used to sight the object, track the object, derive the object parameters mentioned above and compare the object parameters to a stored threshold value.

In detail, the surveying apparatus 700 comprises a control unit 710 with a tracking unit 120, an acquisition unit 720 and a memory 730. The acquisition unit 720 comprises an optical arrangement 740, an imaging device 750, a distance measurement unit 760 and a positioning unit 770.

The control unit 710 is connected to the memory 730 and the acquisition unit 720 to exchange data. For example, the control unit 710 may instruct the acquisition unit 720 to change the setting of the optical arrangement 740, to acquire an image of the object with the imaging device 750, to take a distance measurement with the distance measurement unit 760 or change the position of the acquisition unit 720 using the positioning unit 770.

Further, threshold values of the object parameters may be stored in the memory 730 and can be transferred to the control unit 710 via a connection. The connections shown in FIG. 7 are not limited to physical connections, but may also constitute wireless data connections instead of fixed lines.

The tracking unit 120 may be embodied in the control unit 710, wherein the control unit 710 executes the operations described above or sends out instructions to execute these operations described above or sends out instructions to execute these operations.

In particular, the control unit 710 may receive input data from the acquisition unit 720 to derive object parameters and compare these object parameters to threshold values stored in the memory 730. Subsequently, the control unit, as described above, gives out instructions to the acquisition unit to carry out the herein described functions of the elements of the acquisition unit 720.

The control unit 710 may comprise a processor and may be realized by a hardware arrangement, such as by hard-wired circuits, or ASICs or software or any suitable combination of the above.

The memory 730 may be any suitable memory, such as a RAM, EEPROM or Flash-RAM or a hard disk, and may store code necessary to control the surveying apparatus, such as code executable by the control unit 710 as well as threshold values relating to the above-mentioned object parameters.

In one example, the optical arrangement 740 may consist of a zoom lens arrangement adjustable to perform wide field viewing and narrow field viewing. The lenses of the optical arrangement 740 define the optical axis 746 of the optical arrangement 740 for sighting the object. The lenses 742 and 744 in FIG. 7 are for illustrative purposes, and a skilled person knows several suitable zoom lens arrangements that might be used.

For example, a suitable optical zoom arrangement may be constituted by an arrangement with a concave lens, followed by a convex lens and then again by a concave lens and finally by a concave focusing lens in front of an imaging unit, wherein the convex lens may be adjusted for different zoom settings.

The imaging device 750 aligned with the optical axis of the optical arrangement 740 for acquiring an image of at least part of the object and preferably positioned behind the optical arrangement in its image plane may be constituted by any suitable imaging device, for example, a two-dimensional array of sensor elements capable of generating image information with a number of pixels generally corresponding to the number of elements of the array, such as a charge-coupled device (CCD) camera or a complementary metal-oxide semiconductor (CMOS) camera. Such a sensor array may be composed of 1000×1000 sensor elements to generate digital images with 10 s image pixels.

In a surveying apparatus or surveying instrument, such as a video tachymeter or tacheometer, the actual viewing direction may be defined by a line of sight from a point or one of the elements of the two-dimensional arrangement of sensor elements, e.g. near or at the centre of the array, and through the lenses of the optical arrangement 740.

As described above, the imaging device 750 may be used to obtain one or several object parameters. In one example, when the object is moving in a plane perpendicular to the optical axis of the optical arrangement 740, the object will be imaged on different pixels of the imaging device 750, and thus it will be possible to obtain the path of the object in this plane and also its speed. This information may be used to derive the angular velocity necessary to track the object.

Further, the number of the pixels occupied by the image of the object on the imaging array of the imaging device gives an indication of the size of the object in relation to the field of view of the optical arrangement 740. That means that the more pixels are occupied by the image of the object in the imaging device, the higher the possibility that with a slight movement of the object, the object is lost in the field of view. Hence, it might be recommendable to change the field of view to be able to track the object more easily.

The information acquired by the imaging device 750 regarding the movement or the size of the object may be transmitted to the control unit 710, which derives the corresponding object parameters and compares the object parameters to previously stored threshold values to subsequently send out an instruction to the acquisition unit 720 regarding the change of the field of view of the optical arrangement 740 or a change of the position of the acquisition unit 720 carried out by the positioning unit 770.

The distance measurement unit 760 is provided for measuring a distance from the surveying apparatus to the object along a measurement axis of the distance measurement unit 760 usually parallel to the optical axis of the optical arrangement 740 but preferably the measurement axis 765 may also coincide with the optical axis 746 of the optical arrangement 740.

Further, the distance measurement unit 760 provides a corresponding measurement value of the distance to the control unit 710. For example, the distance measurement unit 760 includes a coherent light source, such as an infrared laser or another suitable laser distance measuring device as known in the art, and preferably a fast reflector-less working EDM.

The value of the distance measurement may then be compared in the control unit 710 to a threshold value to determine whether to instruct the optical arrangement 740 to change its field of view. Further, even if a value for the distance measurement may not be obtained but only an intensity of the back-reflected EDM-signal, this information may also be provided to the control unit 710 to carry out a comparison with a threshold value to determine whether the optical arrangement 740 should receive instructions to change its field of view, as described with respect to FIG. 6D.

The positioning unit 770 is provided for adjusting the optical axis 746 of the optical arrangement 740 relative to at least one reference axis. For example, the positioning unit 770 is realized by an electro-mechanical arrangement comprising preferably magnet servo drives or any other fast drive for precisely positioning the acquisition unit 720.

It is noted that the positioning unit 770 in FIG. 7 is shown as forming part of the acquisition unit 720 but the positioning unit 770 may also be provided independently in the surveying apparatus 700, since it serves to move the optical arrangement 740, the imaging device 750 and distance measurement unit 760 to a position enabling to sight the object and bring the object in the field of view of the optical arrangement 740, in a case where a change of the field of view would not be sufficient, and optionally, to a position to take a distance measurement of the object. The positioning unit may also be regarded as a part of the tracking unit, since it is also used for tracking after the object passes an edge of the imaging array.

Since the positioning unit 770 includes movable components, such as drives, parts of the positioning unit 770 maintain their position in space, i.e. their position is fixed with respect to, for example, a tripod, on which the surveying apparatus is placed, and parts of the positioning unit 770 move in space with respect to a fixed coordinate system, for example, defined by an intersection point of all three axis of the surveying apparatus, referred to the origin.

In the above described embodiment, the tracking unit has been described as being a part of the control unit 710. However, it may be feasible that the tracking unit 120 constitutes an independent element having a microprocessor of its own.

Further, the imaging device 750 or distance measurement unit 760 may also be considered part of a tracking unit, since they supply the tracking unit with necessary information regarding the object parameters necessary to track the object.

For example, it has been described that the imaging device 750 acquires images of the object and thus may be used to follow a path of the object with time. To differentiate the object to be measured from other objects acquired by the imaging device 750, an image processing algorithm known in the art may be used to detect the desired object in the image. When the desired object is detected, it may be followed once moving across the imaging array of the imaging device.

In FIG. 7, the optical arrangement has been described as a zoom lens arrangement. However, as illustrated in FIG. 8, other optical setups may be useful to change between two different fields of view.

Figure 8:
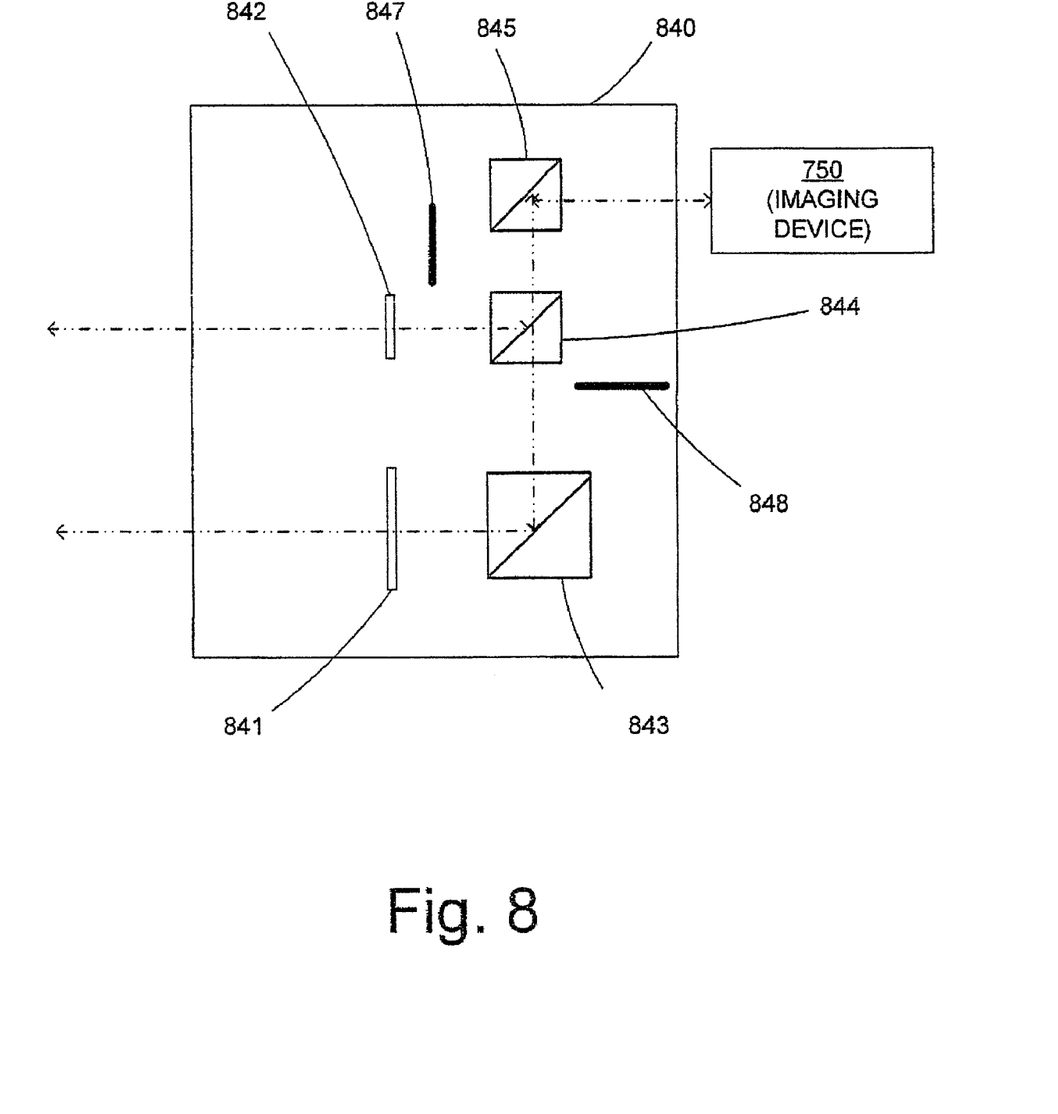
FIG. 8 illustrates elements of an optical arrangement that may be used with the surveying apparatus of FIG. 7.

In FIG. 8, an alternative optical arrangement 840 that may replace the optical arrangement 740 in FIG. 7 is shown.

The optical arrangement 840 comprises at least two lenses 841 and 842 for wide field viewing and narrow field viewing, respectively. Beam splitters 843 to 845 are provided to guide the light from outside the surveying apparatus containing information about the position of the object to the imaging device 750.

To avoid interference or a combination of two images obtained through lenses 841 and 842, respectively, shutters 847 and 848 are provided, which may be moved in the light path, for example, either between the beam splitter cubes 843 and 844 to block the light coming from lens 841 or between lens 842 and beam splitting cube 844 to block the light coming from lens 842. In case of separate optical paths, the relationship between both paths is known by imaging device calibration referred to the axis system of the surveying apparatus.

Alternatively, the optical arrangement 840 may comprise two imaging devices; each placed behind one of the lenses 841 and 842 for wide field viewing and narrow field viewing. With such an arrangement, beam splitter cubes and shutters are not necessary, since light; of the two separate optical paths may fall directly on the first and second imaging device, respectively.

According to another embodiment, a program may be provided including instructions adapted to cause a data processor that may be included in the control unit 710 to carry out combinations of the above operations.

The program or elements thereof may be stored in a memory, such as the memory 730 in FIG. 7, and retrieved by the processor for execution.

Moreover, a computer readable medium may be provided, in which the program is embodied. The computer readable medium may be tangible such as a disk or other data carrier or may be constituted by signals suitable for electronic, optic or any other type of transmission. A computer program product may comprise the computer readable medium.

It should be understood that the operations described herein are not inherently related to any particular instrument and may be implemented by any suitable combination of components. The surveying apparatuses, shown in FIGS. 1 and 7, and described in detail above, constitute preferred embodiments to perform the operations of the described methods. However, this may not be limited only to these surveying apparatuses.

It will be apparent to those skilled in the art that various modifications and variations can be made in the apparatuses and methods of the invention as well as in the construction of this invention without departing from the scope of or spirit of the invention.

The invention has been described in relation to particular examples which are intended in all respect to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspect lie in less than all features of a single foregoing disclosed implementation or configuration. Thus, the true scope and spirit of the invention is indicated by the following claims.

What is claimed is:

1. A surveying apparatus for surveying an object, comprising
an optical arrangement to sight an object; and
a tracking unit to track the sighted object; wherein
the tracking unit is adapted to obtain an object parameter of the object, the object parameter being associated with a movement of the object;
the tracking unit is further adapted to issue an instruction to the optical arrangement to change between a close range setting and a long range setting according to the obtained object parameter, the close range setting corresponding to a wide field of view and the long range setting to a narrow field of view; and the object parameter is proportional to at least the angular velocity necessary to track the object.

2. The surveying apparatus of claim 1 wherein the tracking unit is adapted to track the object to maintain the object on the optical axis of said optical arrangement.

3. The surveying apparatus of claim 1 wherein the tracking unit is adapted to track the object to maintain the object in the field of view of said optical arrangement.

4. The surveying apparatus of claim 1 wherein the tracking unit is adapted to determine whether the object is in the narrow field of view and, if the object is not in the narrow field of view, to instruct the optical arrangement to change from a long range setting to a close range setting.

5. The surveying apparatus of claim 1 wherein the tracking unit is adapted to instruct the optical arrangement to change from a close range setting to a long range setting before performing a position measurement of the object.

6. The surveying apparatus of claim 1 wherein the tracking unit is adapted to compare the obtained object parameter with a threshold value and the optical arrangement is instructed to change the field of view based on the comparison.

7. The surveying apparatus of claim 1 wherein the optical arrangement comprises a first and a second optical unit, and the first optical unit is adapted for wide field viewing and the second optical unit is adapted for narrow field viewing.

8. The surveying apparatus of claim 1 wherein the optical arrangement comprises a zoom lens adjustable to perform wide field viewing and narrow field viewing.

9. The surveying apparatus of claim 1 wherein the object parameter is proportional to at least one of the distance to the object, the size of the object in relation to the field of view, or the intensity of an Electronic Distance Measuring signal (EDM signal) from the object.

10. The surveying apparatus of claim 1 wherein the object parameter is dependent on whether the object is in the field of view.

11. The surveying apparatus of claim 1 further comprising at least one of:
    an imaging device for acquiring an image of at least parts of the object;
    a distance measurement unit for measuring a distance to the object along an optical axis;
    a positioning unit for adjusting the optical axis of the optical arrangement relative to at least one reference axis; or
    a control unit for controlling the components of the surveying apparatus.

12. A method for surveying an object, the method comprising
    sighting an object with an optical arrangement;
    tracking the sighted object;
    obtaining an object parameter of the object, the object parameter being associated with a movement of the object; and
    changing, by using the optical arrangement, between a close range setting and a long range setting according to the obtained object parameter, the close range setting corresponding to a wide field of view and the long range setting to a narrow field of view, wherein the object parameter is proportional to the angular velocity necessary to track the object.

13. The method of claim 12 further comprising tracking the object to maintain the object on the optical axis of said optical arrangement.

14. The method of claim 12 further comprising tracking the object to maintain the object in the field of view of said optical arrangement.

15. The method of claim 12 further comprising:
    determining that the object is not in the narrow field of view; and
    instructing the optical arrangement to change from a long range setting to a close range setting.

16. The method of claim 12 further comprising instructing the optical arrangement to change from a close range setting to a long range setting before performing a position measurement of the object.

17. The method of claim 12 further comprising comparing the obtained object parameter with a threshold value and instructing the optical arrangement to change the field of view based on the comparison.

18. The method of claim 12 wherein wide field viewing is performed with a first optical unit and narrow field viewing is performed with a second optical unit.

19. The method of claim 12 wherein wide field viewing and narrow field viewing are perform with a zoom lens in the optical arrangement to change between a close range setting and a long range setting.

20. The method of claim 12 wherein the object parameter is proportional to at least one of the distance to the object, the size of the object in relation to the field of view, or the intensity of an EDM signal from the object.

21. The method of claim 12 wherein the object parameter is dependent on whether the object is in the field of view.

22. The method of claim 12 further comprising at least one of:
    acquiring an image of at least parts of the object;
    measuring a distance to the object along an optical axis; or
    adjusting the optical axis of the optical arrangement relative to at least one reference axis.

* * * * *